Aug. 4, 1931. H. A. W. WOOD 1,816,948
LOCK-UP FOR ROLLS
Filed May 4, 1929
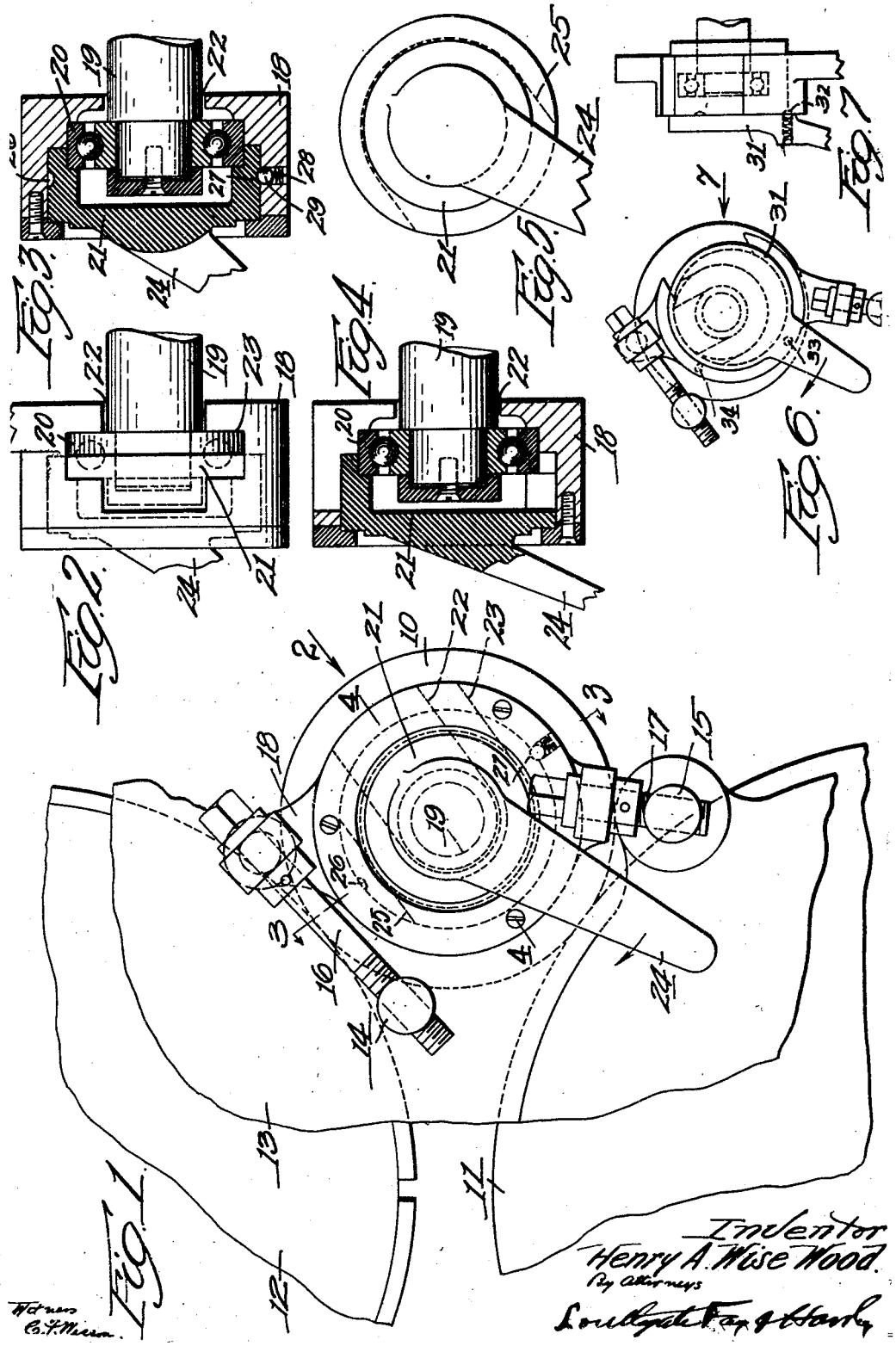
Inventor
Henry A. Wise Wood Patented Aug. 4, 1931

1,816,948

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

LOCK-UP FOR ROLLS

Application filed May 4, 1929. Serial No. 360,448.

This invention relates to a quick lock-up for a roll which constitutes a part of a system of rolls or cylinders and it is particularly adaptable for use with the form roll of an inking system.

The principal objects of the invention are to provide means whereby the roll can be held in fixed position for operation and yet it can be very easily unlocked so that the roll can be withdrawn from its supports at both ends and can be just as easily replaced and locked up again, and to provide a construction which will save much time in changing a damaged roll during a run and also in locking and unlocking rolls at the beginning and end of runs. The invention also involves means in the form of an oscillatable cap for holding the roll during operation which has a slot through which the bearing of the roll can be removed, when the cap is turned to another position and means by which this can be done whether the roll is concentric with the cap or not.

Other objects and advantages of the invention will appear hereinafter.

Reference is to be had to the accompanying drawings in which

Fig. 1 is an end view of a part of a plate cylinder inking system showing a preferred embodiment of this invention;

Fig. 2 is an elevation of the roll supporting means, taken in the direction of the arrow 2 in Fig. 1;

Fig. 3 is a sectional view on the line 3—3 of Fig. 1;

Fig. 4 is a sectional view on the line 4—4 of Fig. 1, both these figures showing the roll in locked position;

Fig. 5 is an end view of the cap, and

Figs. 6 and 7 are respectively end and side elevations of a modification.

As stated, this invention relates to a quick lock-up particularly adapted for a composition or rubber roll forming a part of an inking system. Such a quick lock-up is of importance for several reasons. Much time is saved in changing a damaged roll during a run. The roll can be locked or unlocked at the beginning or end of the run almost instantaneously, thus saving the time that has been employed usually in locking these rolls in position in the usual way. Furthermore, a pressman will be less apt to neglect a duty that is easy to perform, as in the present case, than he would where he had to go through all the trouble that has been necessary heretofore. He is not likely to leave rolls locked up when they should be changed, thus reducing the flats and other troubles caused thereby.

The invention is shown as applied to a form roll 10 which transfers ink from an ink drum 11 to a plate cylinder 12. The frame 13 of the machine is provided with poppets 14 and 15, which, by means of screws 16 and 17, are adapted to adjust the two sockets 18 in which the shaft 19 of the roll 10 has its bearings.

The shaft is shown as provided with ball bearings having an outer race 20. This outer race has a seat in the socket 18 and also in a cap 21. The socket 18 has a slot 22 through which the shaft 19 can be introduced and also a slot 23 for receiving the outer race 20. These slots are arranged radially and obviously a roll can be introduced through these slots into its final position.

This alone would not hold the roll and for that reason the cap 21 is provided. This cap has a handle 24 for turning it in its seat in the socket 18. It also has a radial slot 25 which is shaped like the two slots 22 and 23 having a space through which the end of the bearing is introduced and a space through which the half of the outer race 20 is introduced.

The cap 21 is provided with two notches 26 and 27 shown in the first five figures as arranged opposite each other. In the socket is a spring 28 having a ball 29 to enter the notch 26 or 27 and hold the cap in either one of its two positions. In the position shown in the drawings, the cap is locked with its slots parallel with the slots 22 and 23. In this position, the cap of course offers no resistance to the introduction and removal of the shaft with its bearing. When it is introduced, the cap is turned by its handle 24 from the position shown in these figures to exactly the opposite position in which the solid part of the cap holds the ball bearing and prevents its removal.

The roll having been properly adjusted by the screws 16 and 17, it can be almost instantly released and replaced while the machine is running. Obviously at the beginning and end of the run it can be introduced and removed with practically no loss of time. Heretofore it has required several minutes in which to unbolt the parts and secure them on again when a roll is to be replaced. No readjustment is necessary.

In the form shown in Figs. 6 and 7, the same construction is shown except that the center of the roll 10 does not coincide with the center of the cap 21. In this type, the roll is offset so that the roll can be set off quickly by turning it out away from the plate cylinder and the ink drum without removing the roll from its socket and can then be set back again in the same place very readily. In this case, the cap 31 is of substantially the same construction but it has a spring-pressed ball 32 which enters two notches 33 and 34 in the socket and these notches are placed only about 90° apart. In this case the cap holds the roll in position just the same but has to be moved through a shorter angle to bring its slot into position for removal of the roll.

Although I have illustrated and described only two forms of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. The combination with a socket for receiving the shaft and bearing of a roll, said socket having a radial slot through which both the shaft and bearing can be introduced radially, of a movable member having a slot for receiving the bearing and adapted to be placed in position to permit the insertion or removal of the bearing and to be moved to a different position in which the bearing is locked in position.

2. The combination with a socket having a radial slot through which both a shaft and its bearing can be introduced radially, of an oscillatable member carried by the socket and having a similar slot for receiving the bearing and adapted to be placed in position to permit the insertion or removal of the bearing and to be turned at an angle to a position in which the bearing is locked in position.

3. In an inking system, the combination with a form roll plate cylinder and ink drum, of a socket for receiving the shaft and bearing of the form roll having a radial slot through which both the shaft and bearing can be introduced, of a cap having a surface for retaining the outer race of the bearing and provided with a radial slot, said cap being adapted to be turned to two positions in one of which the bearing can be introduced and in the other of which it holds the bearing in place.

4. In an inking system, the combination with a form roll, a plate cylinder and an ink drum, of a slotted socket for receiving the shaft of the form roll, and a slotted holding cap for the shaft oscillatable about an axis and having means for holding it in either one of two positions in one of which the cap is located with its slot registering with the slot in the socket and in the other of which it holds the shaft in position and prevents its removal.

5. In an inking system, the combination with a form roll, a plate cylinder and an ink drum, of a slotted socket for receiving the shaft of the form roll, means carried by the frame of the machine for adjusting the socket to bring the roll into proper contact with the ink drum and plate cylinder, and a movable retaining cap for the shaft having a slot and means for holding the cap in either one of two positions in one of which the cap is located with its slot registering with the slot in the socket and in the other of which it holds the shaft in position and prevents its removal, said holding means being spring-pressed whereby the cap can be turned by applying enough force.

In testimony whereof I have hereunto affixed my signature.

H. A. WISE WOOD.